(12) United States Patent
Adair et al.

(10) Patent No.: US 6,490,381 B1
(45) Date of Patent: Dec. 3, 2002

(54) FABRY-PEROT OPTICAL SWITCH

(75) Inventors: Robert W. Adair, Santa Rosa, CA (US); Glenn A. Clarke, Rohnert Park, CA (US); Bryant P. Hichwa, Santa Rosa, CA (US); Christopher Iaconis, Santa Rosa, CA (US); Douglas G. Jensen, San Rafael, CA (US); Stephen C. Olson, Santa Rosa, CA (US); James W. Seeser, Saint Louis, MO (US); Basil L. Swaby, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 140 days.

(21) Appl. No.: 09/585,664

(22) Filed: Jun. 1, 2000

(51) Int. Cl.$^7$ .............................. G02B 6/42; G02B 6/30
(52) U.S. Cl. ............................ 385/16; 385/18; 385/22; 385/49
(58) Field of Search .............................. 385/16, 18, 22, 385/40, 49, 50

(56) References Cited

U.S. PATENT DOCUMENTS

| | | | |
|---|---|---|---|
| 4,253,728 A | 3/1981 | Venkatesan | 350/96.15 |
| 4,947,223 A | 8/1990 | Biefeld et al. | 357/30 |
| 5,027,178 A | 6/1991 | Svilans | 357/30 |
| 5,345,328 A | 9/1994 | Fritz et al. | 359/248 |
| 5,425,115 A * | 6/1995 | Wagner | 385/16 |
| 5,606,439 A * | 2/1997 | Wu | 349/117 |
| 5,631,765 A * | 5/1997 | Baur et al. | 359/267 |
| 5,835,517 A * | 11/1998 | Jayaraman et al. | 372/101 |
| 5,909,303 A * | 6/1999 | Trezza et al. | 359/245 |
| 6,040,932 A * | 3/2000 | Duck et al. | 359/124 |
| 6,041,071 A | 3/2000 | Tayebati | 372/64 |
| 6,061,171 A | 5/2000 | Taylor et al. | 359/341 |

FOREIGN PATENT DOCUMENTS

| | | | | |
|---|---|---|---|---|
| EP | 0 638 836 A1 * | 2/1995 | | G02F/1/31 |
| WO | WO 97/40420 | 10/1997 | | G02F/1/21 |

OTHER PUBLICATIONS

Ortega et al., Wavelength Division Multiplexing All–Fiber Hybrid Devices Based on Fabry–Perot's and Gratings, Jul. 1999, Journal of Lightwave Technology, vol. 17, No. 7, pp. 1241–1247.*

* cited by examiner

Primary Examiner—Hemang Sanghavi
Assistant Examiner—Omar Rojas
(74) Attorney, Agent, or Firm—Scott W. Hewett (57) ABSTRACT

The absorption of a spacer material in a Fabry-Perot type structure is changed to achieve an optical switching function. In one embodiment, the spacer material is a semiconductor material and an electronic control signal changes the Fabry-Perot between a transmissive state and a reflective state. In the reflective state, the device operates as a switch can be modeled as a mirror on a substrate of quasi-infinite thickness. In a further embodiment, a wavelength-selective optical component is placed between the input of the switch and the Fabry-Perot structure to improve the spectral response of the switch.

17 Claims, 8 Drawing Sheets

FABRY-PEROT OPTICAL SWITCH

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to devices for optical signal routing, and more particularly to a non-mechanical solid-state optical switch.

BACKGROUND OF THE INVENTION

In optical communication networks, light signals are transmitted along optical paths, such as optical fibers. Although the propagation of light signals along optical fibers is somewhat analogous to the transmission of electronic signals along wires, transferring the light signals from one optical fiber to another is somewhat more difficult than coupling electrical wires together. In particular, switching a light signal from one optical path to another, such as from an input fiber to one of several output fibers, has been more difficult than similar switching of electrical signals for a variety of reasons.

Generally, when switching an optical signal, the light from one optical fiber is coupled to another optical fiber. Several approaches have been used to achieve such optical switching. One approach is to physically move the end of one fiber between positions so that it becomes aligned with an end of the desired output fiber. However, modern optical fibers have a very small across section, and typically have a fairly narrow acceptance angle within which light entering the fiber must fall to promote efficient propagation of the light along the fiber. Therefore, such optic switches must not only be precisely aligned, but also must stay suitably aligned. Additionally, the fibers themselves are glass and must be handled carefully to avoid breakage, which may be exacerbated by the physical motion of the fiber each time switching occurs.

Other approaches hold the fibers stationary while moving an optical element, such as a mirror or prism, to direct the light signal from the input fiber to one of the output fibers. Such approaches are described in U.S. Pat. Nos. 5,838,847 and 5,959,756. While the problem of flexing the optical fibers is avoided by these approaches, they generally require precise alignment of the optical components, including the fiber ends, and should retain this alignment over the operating lifetime of the switch. Mechanical factors, such as wear and mechanical shock, can affect the alignment of the switch. Furthermore, such switches are relatively large, in light of the movable mechanical structure, which can also affect switching speed because of the inertia of the mechanics, and can consume a relatively large amount of electrical energy to switch, particularly at high switching speeds. Some mechanical switches are also susceptible to bouncing, which can lengthen the time required for reliable switching.

As the demand for optical communications expands, the number of switches required for the optical networks that carry the optical signals increases. One factor contributing to the increased number of switches is the growing use of wave-division multiplexing ("WDM"). In a WDM system, a single optical fiber carries many different "channels", which are generally portions of the optical spectrum that can be separately routed and otherwise manipulated from each other. For example, a WDM optical network carrying four channels on a single fiber might service two users, each with two channels. Two of the channels can be routed ("dropped") to the first user, while the other two channels continue to the next user. In order to fully utilize all the channels, optical signals occupying the dropped channels can be added onto the optical fiber. Thus, it may be desirable provide the capability to switch each channel separately from the others.

As the number of optical channels carried on an optical fiber increases, the number of switches is likely to similarly increase. Some optical networks are using dense wave-division multiplexing ("DWDM"), with channels spaced every 100 GHz. Other networks are being planned where the channels are spaced even closer, and where more of the optical band is being used to carry channels. Optical communication systems might be developed that have a need for significantly more switches than current systems. It may be difficult to accommodate an expansion of the existing fiber network with sufficient space for the necessary additional switches.

Fabry-Perot based structures have been used in a variety of laser-switching functions, but the structures developed for these applications are generally unsuitable for optical telecommunication switching purposes. For example, among the most numerous Fabry-Perot structures are the asymmetric structures, in which the reflectivity of one cavity mirror differs from the other. Asymmetric configuration generally reduces the photon lifetime in the cavity, allowing for ultrafast (picosecond) switching. In addition the electric field is enhanced in the cavity, increasing the overall absorption. The majority of these devices consist of thin films of semiconductor materials.

The asymmetric Fabry-Perot devices are primarily used as reflection modulators. In the majority of configurations the incident light enters the device through the weaker of the two reflectors. When the spacer layer is in an absorbing state, the reflectivity of the device is low. When the spacer layer is in a transparent state the reflectivity is primarily from the back reflector and is of a high level. In many cases these devices consist of a single layer of high index material on a high reflector. A predominant method for altering the absorption is through an electric field induced shift in the semiconductor band edge that occurs either through the Franz-Keldysh effect (in bulk media) or the quantum confined Stark effect (in quantum well structures.)

These asymmetric Fabry-Perot devices are not suitable for reflection/transmission switches for the telecommunication market for several reasons. As these devices are operated in a reflectance mode only, the structures are typically grown on substrates that are absorbing at the wavelength of interest. In addition, the asymmetric mirrors often preclude low transmission loss.

Other asymmetric Fabry-Perot devices use all optical switching through nonlinear effects. Refractive index changes are generally used in these devices to change the spacer center-wavelength and hence the spectral position of the reflectance minimum. In an optical communication application, the shift in the frequency response of the reflectance could interfere with other optical channels on the system.

There are also a number of Fabry-Perot based devices whose spacer layers exhibit a change in refractive index, and hence effective optical path length with an external stimulus. These typically are intended to be tunable, since changing the refractive index of the spacer layer changes the resonant frequency of the cavity. A problem with these devices in switching applications is that they will sweep across other wavelengths and disrupt communication in those channels. In fact, most devices that modulate the index cannot stay in the same channel passband while changing state.

Another popular class of devices involves all-optical switching with a bistable resonator configuration, often with the spacer layer consisting of a saturable absorber. Planar semiconductor Fabry-Perot laser structures have been analyzed and demongrated for this application. Vertical-cavity semiconductor laser ("VCSEL") structures have also been demonstrated with an all-optical bi-stable switching behavior. These amplifiers have been pumped both optically and electrically. VCSEL structures are thin film based devices in which a quarter-wave stack mirrors and the spacer layer(s) are typically all semiconductor materials. One advantage of the VCSEL structure is compactness compared to a waveguide-based semiconductor amplifier device. However, these devices generally do not provide for transmission through them, as the substrate material that VCSELs are fabricated an is typically opaque at the wavelength of interest. In addition, VCSEIs are predominately used as lasers, which require a different set of design parameters (such as high gain) than optical switches and attenuators.

All-optical bistable switching has been researched for use in optical computing applications, where such a device would function as an "optical transistor". Such optical bistable switches are not suitable for current telecommunications switching applications; however, because they are dependent on the intensity level of the incident signal. The spacer medium is nominally absorbing, so at low incident light levels the device is non-transmitting. If the intensity of the incident light is sufficiently increased, the absorbing mechanism in the spacer layer will saturate, and the device will transmit light. A high E-field builds up in the spacer layer once the device has become transmitting, and the spacer layer will remain transparent for lower incident light levels than that which initially turned on the device. Thus, the device is non-reciprocal, and would absorb weak optical signals, even if the switch were "on".

Thus, it is desirable to provide an optical switch that is relatively small in size, reliable in operation, with a long operating lifetime, and that consumes relatively little power to switch states, and that can switch a channel carried on an optical communication network without disrupting adjacent channels. In a particular application, the optical switch should have very low loss (<0.5 dB) in either state and a high switching speed (<10 ns) in order for efficient operation in all-optical networks.

DETAILED DESCRIPTION OF THE INVENTION

I. Introduction

The present invention uses a Fabry-Perot ("FP") type structure in an optical switching application. Optical properties of the spacer material between reflectors are controlled to change the switch from an essentially reflective state to an essentially transmissive state, and vice versa, according to an external stimulus. In the reflective state the optical channel(s) of interest are reflected from an input waveguide to an express waveguide. In the transmissive state the optical channel(s) of interest are transmitted to an output waveguide. The external stimulus can be electric, magnetic, thermal, acoustic, optical, and/or mechanical and serves to change the absorption and/or scatter of the spacer section. The spacer material can be semiconductor material, suspended liquid crystal, or electrochromic material, among others.

For the purposes of discussion, a FP structure will be used to mean a spacer section, such as a layer or segment of waveguide, with reflectors at each end. The reflectors can be dielectric stacks, Bragg grating reflectors, metal layers, and solid mirrors, or combinations thereof. Other suitable reflectors may be known or become known to those skilled in the art. The spacer section can be of the form of a layer, thin film (including a bonded thin film), waveguide, optical fiber, or polymer layer. Similarly, other types of spacer sections and/or materials might be known or become known to those skilled in the art.

Other solid-state optical switches have been described; however, many such devices operate by changing the optical length of a portion or portions of the switch's optical path. The optical length is generally the product of the real portion of the refractive index, n, and the physical length of the optical path. Thus, such devices generally change the physical length (such as by electrostriction, magnetostriction, and/or thermal expansion), and/or the real portion of the refractive index of the material comprising the path. The passband of such devices often changes as the device switches, which can make the switch undesirable for optical telecommunication applications.

II. An Exemplary Fabry-Perot Optical Communications Switch

Figure 1A:
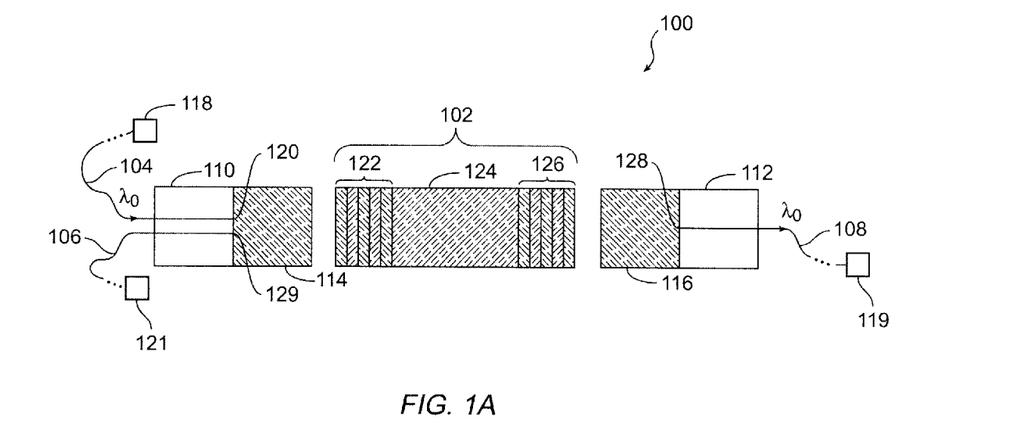
FIG. 1A is a simplified cross section of a Fabry-Perot switch in a first switch state according to embodiment of the present invention.

FIG. 1A is a simplified cross section of an optical switch 100 in a first (transmission) switch state according to an embodiment of the present invention. A FP structure 102 mechanically and optically couples to optical fibers 104, 106, 108 using ferrules 110, 112 and lenses 114, 116. The optical fibers operate as "ports" and other types of coupling structures could be used, such as micro-machined waveguides. The lenses could be graded-index refraction ("GRIN") lenses, for example, as are well known in the art. A first ferrule 110 holds an input fiber 104 configured to receive a signal(s) from an optical source 118 and a first output fiber 106 that is coupled (eventually) to a first destination 121. The first tens 114 expands the light in a collimated fashion from the relatively small end 120 of the input fiber held by ferrule so that the light illuminates the FP structure. The components of the structure are typically optically aligned, such as by sliding and/or rotation, and then cemented or soldered in place. Although terms such as "source" and "destination" are used it is understood that many optical devices are generally reciprocal, and any indication of the direction of an optical signal is used for convenience of illustration and discussion only. It is further understood that the positions of the optical elements are illustrative only, for example, the positions of the ends of the fibers in relation to each other or the lenses.

The FP structure 102 includes a first reflector 122, a spacer region 124, and a second reflector 126. A second lens 116 gathers light transmitted through the second reflector 126 and focuses it onto the end 128 of the second output fiber 108, which is held in the second ferrule 112. The second output fiber is (eventually) optically coupled to a second destination 119. The reflectors are shown as having many layers, as might be formed for in a stack of alternating dielectric layers. This representation is illustrative only. The change in the spacer region 124 between transmissive (in FIG. 1A) and absorptive (in FIG. 1B) is represented by different hatching in each state. In a particular embodiment, the FP structure has an area of about 1 mm$^2$. A spacer material of an InP-based semiconductor nominally about 200 nm thick is used and an electric voltage of about 5 V is applied as the control signal.

The light transmitted through the FP structure generally has a half wavelength that, when divided into the effective optical length of the FP structure, results in an integer. Often, for simplification of modeling, the dimension of the spacer material and its index of refraction is used to approximate the optical length of the FP structure. The bandwidth of the FP structure and hence the optical switch can be varied by reducing the reflectivity of the reflectors; however, the reduced reflectivity typically decreases state isolation. In order to attain the low insertion loss desired for optical telecommunication switching applications, the reflectors should be balanced sufficiently to allow for less than 0.5 dB loss in transmission. The required similarity will be dependant on the passband width of the filter. The passband width is the width in wavelength (or equivalent frequency) of the spectral response 3 dB down from a minimum insertion loss point.

Other mechanisms for coupling the fibers to the FP structure may be used or become apparent, such as using a fiber with a lensed tip rather than a GRIN lens, or micromachined channels or V-grooves rather than ferrules to hold the optical fibers. The reflectors in the FP structure can be stacks of dielectric thin-film layers, and can have, but do not have to have, essentially equal reflectivity characteristics. One or more of the layers in the stack can be an optically transparent conductor, such as indium-tin oxide ("ITO") or an appropriately doped semiconductor.

The optical switch changes from one state to another by changing the imaginary portion of the refractive index of material in the spacer region in response to a control signal. Each state is analogous to a "Position" of a conventional mechanical switch. In the first switch state shown in FIG. 1A, the input fiber 104 carries an optical signal within the passband of the FP structure having a nominal wavelength $\lambda_o$ that is optically coupled to the second output fiber 108. It is understood that the input fiber could carry additional optical signals, that the wavelengths generally represent portions of the spectrum, or "bands", and that the switch can operate, i.e. change states, without an optical signal present. Transmittance thru the FP structure occurs at the wavelength where the two reflectors interfere to cancel out the reflection at the front surface. It is further understood that reference to "application of a control signal", as used herein, could mean removal of an external stimulus, such as removing a potential or turning off a high-energy photon source, as well as providing the stimulus. Those skilled in the art will appreciate that the nature of the control signal will vary according to the properties of the material chosen, in particular how k changes in response to an external stimulus.

In one embodiment, the reflectors 122, 126 are multi-layer Bragg reflectors that consist of transparent oxides of silicon, tantalum, niobium, titanium and/or zirconium, or GaAs or InP based semiconductors typically about 100–250 nm thick. The spacer material is a GaAs or InP based semiconductor material that contains a number of quantum wells situated in an area of a high electric field, although other spacer materials, both semiconductor and non-semiconductor, can be used. The imaginary portion of the refractive index of the spacer material is selectively changed by applying an electric potential across the spacer material through appropriately placed electrodes, however in some embodiments the control signal is essentially a voltage-only signal, and the electrodes do not need to make a current-carrying contact with the spacer material. The electrodes may consist of layers of transparent conductive oxide placed on the two faces of the spacer or at the ends of appropriately doped conductive semiconductor reflectors. In addition, the electrode may consist of metals placed on the structure outside of the optical path with a coplanar dielectric aperture used to channel the current through the desired portion of the spacer. The reflector layers and spacer are formed such that optical signals within the passband of the FP structure (in the transparent state) are transmitted with low (less than about 0.5 dB) insertion loss in the transmission state while optical signals outside of the passband are reflected with low (less than about 0.5 dB) reflection loss. When the spacer material is changed to an absorbing or scattering state, the first mirror becomes reflecting for optical signals within the passband of the FP structure.

Figure 1B:
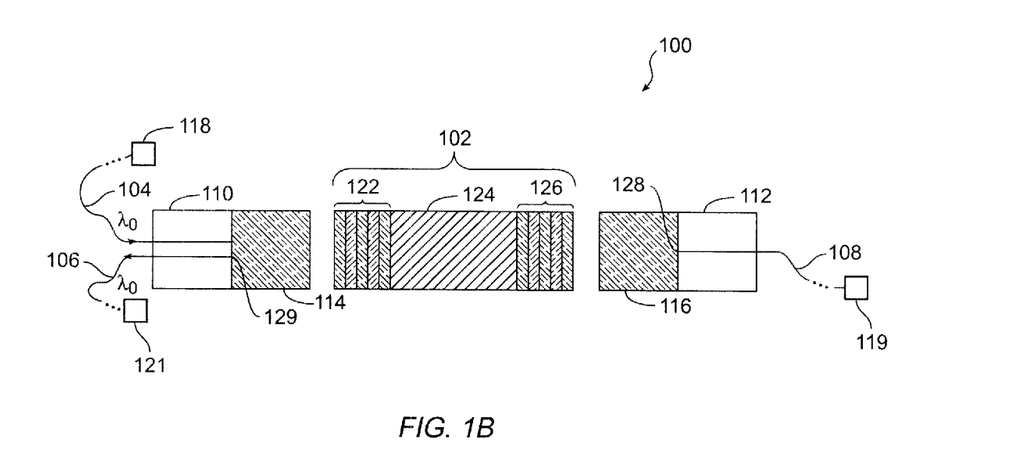
FIG. 1B is a simplified cross section of the Fabry-Perot switch shown in FIG. 1A in a second switch state.

FIG. 1B is a simplified cross section of the optical switch shown in FIG. 1A in a second state. In this state, material in the spacer region 124 has become more absorbing from the application of an external stimulus to operate the switch. For purposes of discussion, the term "absorption" includes photon scattering, and that absorption, by scattering or other mechanisms, generally results in the removal of photons from the spacer region. Similarly, material making up the spacer region that is capable of changing its refractive index is referred to herein as "active" material. There are two basic types of active materials. A first type of active materials changes from absorbing to non-absorbing primarily through a change in the imaginary part ("k") of the refractive index of the active material. A second type changes the real part ("n") of the refractive index, and/or an optical path length through the material. It is understood that the transition of the first type of active material from an absorbing state to a transmitting state and vice versa results in a change in the real part ("n") of the refractive index through the Kramers-Kronig relations; however, it is desired that the change in k has the dominate effect on the device performance. Similarly, only a portion of the spacer region might be made of an active material, or different active materials might be combined in the spacer region.

As the spacer region becomes absorbing, the portion of the optical signal that is reflected off the second reflector into the spacer region is reduced, and the switch in this state can be modeled as a reflector (the first reflector 122) on an opaque substrate (the spacer region 124) of quasi-infinite thickness. Thus, reflection of the optical signal $\lambda_0$ from the input fiber 104 to the end 129 of the second output fiber 106 is off of the first reflector 122. However, the effect on switching function of the spacer region surrounded by mirrors in the FP structure is different than a mirror coupled to a layer of the same material and thickness that is not in a FP structure.

As shown below in to FIGS. 5 and 6, the transition between a transmissive state and a reflective state is smooth and well behaved, that is, the passband of the FP structure does not tune away from the center frequency, and the filter shape is generally preserved through the transition. The transmission loss increases in a predictable and controllable fashion, as does the reflection loss in a complimentary fashion.

Thus the device shown above in FIGS. 1A and 1B can be operated as a electronically variable optical attenuator, variable optical splitter, or other device. As an optical attenuator, the device could be operated as a two-port device, with the insertion loss between the input and the output being varied according to a proportional control signal. Note that the output could be either a transmissive output (e.g., FIG. 1A, ref. num. 108) or a reflective output (e.g., FIG. 1A, ref. num. 106). That is, the device could be operated to vary its reflection or to vary its transmission.

As an electronically variable optical splitter, the device could be operated to transmit a first selected amount of an incident (input) light signal, and to reflect a second selected amount of the incident light signal. The device could be designed to operate over a very narrow band, such as about 100 GHz, or over a wider band to accommodate a number of optical channels; however, increasing the bandwidth of the device often reduces the minimum insertion loss within the passband.

II. Active Region Characteristics

Figure 2:
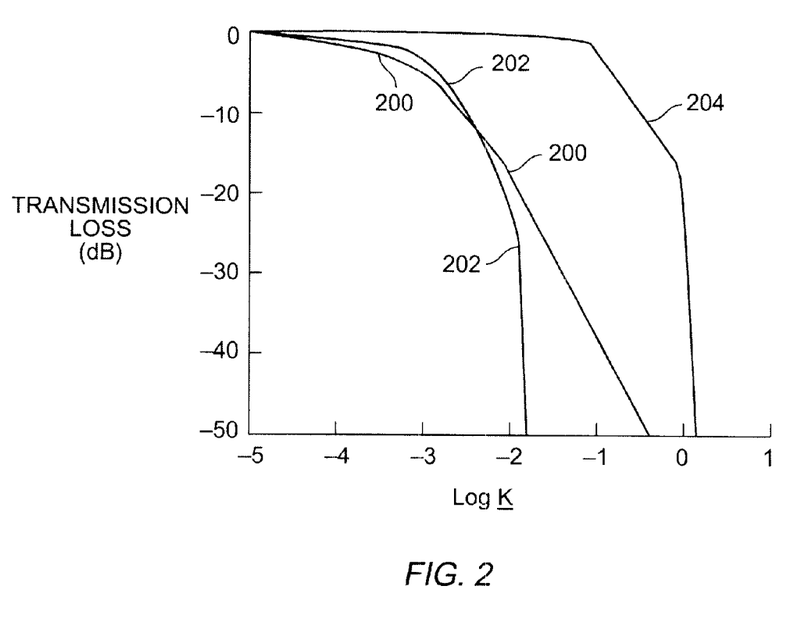
FIG. 2 is a graph of the expected transmission loss versus log k for an idealized layer of material in a Fabry-Perot structure and as a stand-alone layer.

FIG. 2 is a graph comparing the expected effect of absorption on transmittance in a thin (~200 microns thick) layer of an active material in a FP structure 200 and as a thin single layer 202, versus log k. Also shown is the absorption of a thick single layer (~20,000 microns thick) 204 of the material. The active material essentially clear (no transmission loss) at when k is very small (about $10^{-5}$). Both the thin layer and the thick layer are integer multiples of a halfwave at the wavelength of interest. An external stimulus, such as an electric potential, applied to the active material to selectively changes k, and the graphs generally represent the change in k that would be required to achieve a particular change in transmittance or reflection.

As the material becomes more absorbing, it will initially have a much greater effect on transmittance if the material is in an FP structure, rather than as a single layer of comparable thickness. It is believed that this effect arises due to the high electric field in the FP spacer region, which enhances the apparent absorption seen externally. As the absorbance increases, the electric field is reduced, making the two cases more comparable. The thick layer shows the same initial transmittance characteristics at the thin layer in the FP structure, however it drops off faster after a sufficient change in k.

Figure 3:
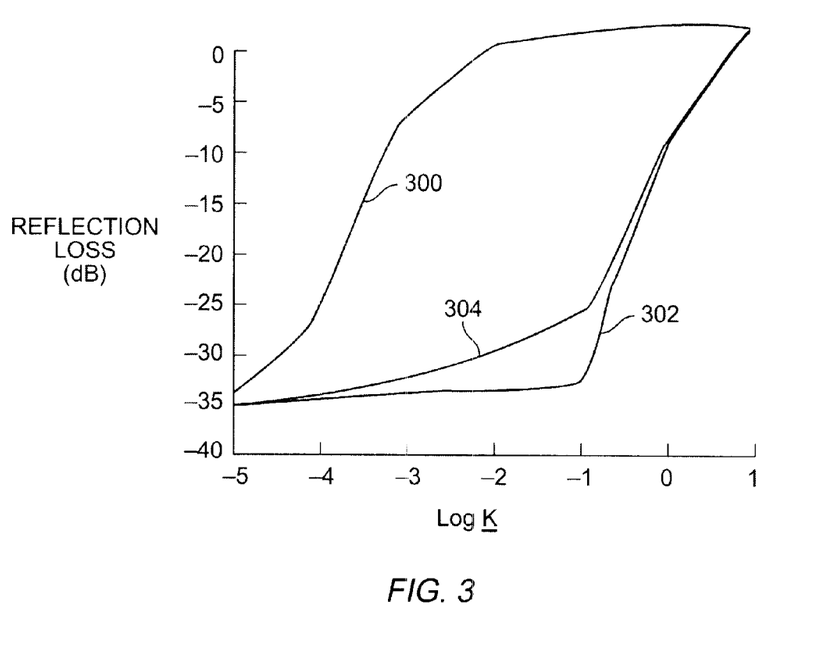
FIG. 3 is a graph of the expected reflection loss versus log k for the layers shown in FIG. 2.

FIG. 3 is a graph comparing the expected reflectance in the thin layer of the active material shown in FIG. 4 in the FP structure 300 and as a single layer 302, versus log k. The reflectance for the thick single layer 304 is also shown. The FP structure achieves high reflectance at relatively low values of k in the active medium. For the single layer, the reflectance is essentially a function of k only, and a high reflectance is not achieved until the material is optically metallic. Thus, the placement of the active medium in a FP structure allows for efficient switching between a reflective and transmissive state at relatively low values of k and with relatively small changes in k being required to operate the structure as a switch. Being able to use materials with relatively low values of k is desirable because it increases the number of active materials that can be used in switching applications.

One class of active materials that change absorption in response to an external stimulus is semiconductors. There are a number of possible mechanisms for materials in the semiconductor class to change absorption. For example, free carrier absorption can occur when incident photons have energy significantly below the bandgap energy of the semiconductor material. An intrinsic semiconductor is nominally transparent at photon energies below the bandgap. If free carriers are excited into the conduction band the material will become absorbing. The absorption mechanism is excitation of the free electrons into higher states within the conduction band. The conduction band can be populated either through optical excitation with a pump beam above the bandgap of the material or electrically through carrier injection.

At photon energies just below the nominal bandgap energy of the semiconductor material, the Franz-Keldysh or the Quantum Confined Stark Effect can be used to provide a variable k value through electroabsorption. In this region the k value of the semiconductor is small enough to allow significant transmission of light through the device. When a proper external signal is applied to the semiconductor, the band-edge moves to lower photon energy, increasing the k-value at a particular (fixed) wavelength.

At photon energies above the bandgap, the semiconductor is absorbing. The absorption mechanism is optical excitation of electrons from the valence band to available states in the conduction band. This absorption mechanism can be reduced through a population inversion between the conduction and valence bands. With an increasing population inversion the value of k will decrease and ultimately become negative, allowing for gain in the medium. The mechanisms for achieving population inversion are the same as those for the free carrier effect.

Another class of materials that can provide variable absorption is electrochromics. A mechanism for photon scattering can be achieved using a polymer-dispersed liquid crystal composite material. This material consists of spheres of liquid crystal imbedded in a polymer matrix. The diameter of the spheres is large enough to scatter light at the wavelength of interest. The refractive index along the optical axis of the liquid crystal matches the index of the polymer matrix, which is essentially transparent to the wavelengths of interest. Normally the liquid crystals in the spheres are randomly oriented and the diameter of the spheres is large enough to scatter light at the wavelength of interest. However if an electric field is applied along the proper orientation, the liquid crystals in the spheres will line up such that the medium becomes transparent. It is understood that the terms "reflection" and "transmission" are used herein to describe the predominate mechanism operating on the light signals, and that the mirrors are not perfect in that not all light is completely reflected, nor is all light within the passband transmitted.

III. WDM Applications

Figure 4A:
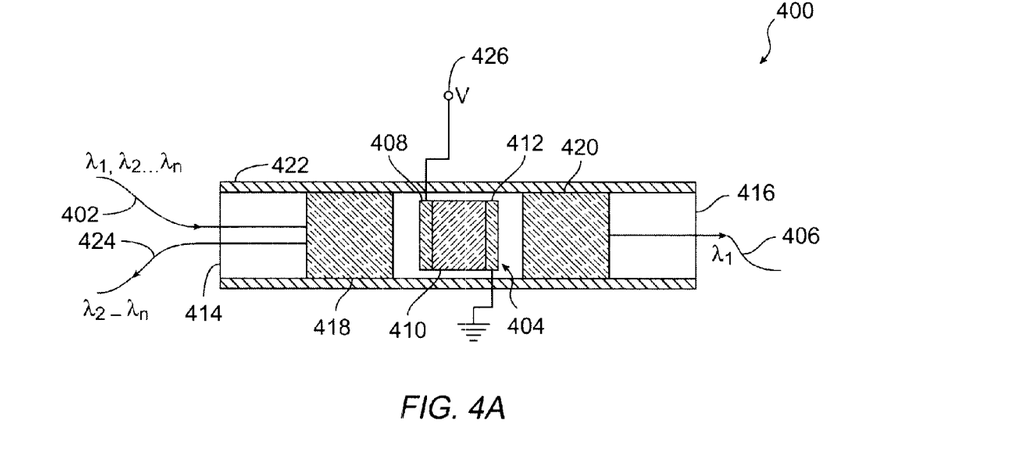
FIG. 4A is a simplified cross section of a wavelength-selective switch according to an embodiment of the present invention.

FIG. 4A is a simplified schematic of an optical switch 400 according to another embodiment of the present invention for use in a WDM or similar application. A COMMON fiber 402 provides a plurality of optical signals, $\lambda_1, \lambda_2, \lambda_3, \ldots, \lambda_n$, or channels, each occupying a portion of the spectrum. The dimensions and materials of the FP structure are selected to preferentially transmit one or more of the optical signals, e.g. $\lambda_1$, when the switch is in the transmission mode. It is understood that $\lambda_1$ is used only as an example, and that the switch could be designed to transmit another channel or channels with proper selection of the materials and dimensions. In particular, the switch bandwidth may include a number of adjacent channels.

In the transmission state, $\lambda_1$ is transmitted from the COMMON fiber 402 to a DROP 406 fiber through a FP structure 404 having a first reflector 408, a spacer region 410, and a second reflector 412. Ferrules 414, 416 and collimators 418, 420 such as GRIN lenses, are used to mechanically and optically couple the optical fibers and the FP structure. A tubular housing 422 is used as hold the various components in alignment. Thus, the selected channel, $\lambda_1$, is removed (dropped) from the common light path. The remainder of the channels, $\lambda_2, \lambda_3, \ldots, \lambda_n$, are reflected off of the first reflector 408 onto the EXPRESS fiber 424 when the FP structure is in the transmissive state.

A control signal 426, such as an electric voltage, is applied to the material of the spacer region 412 to change the switch to a reflective state by changing the absorptivity of material in the spacer region. It is specifically understood that the application of the control signal to switch from transmissive to reflective is illustrative only, and that the switch might be in the reflective state, the control signal being applied to switch from reflection to transmission. In the reflection state, $\lambda_1$ is reflected off of the first reflector 408 onto the EXPRESS fiber 424. Thus, in the reflective state all optical signals from the COMMON fiber 402 are reflected to the EXPRESS fiber 424 off the first reflector 408.

Figure 4B:
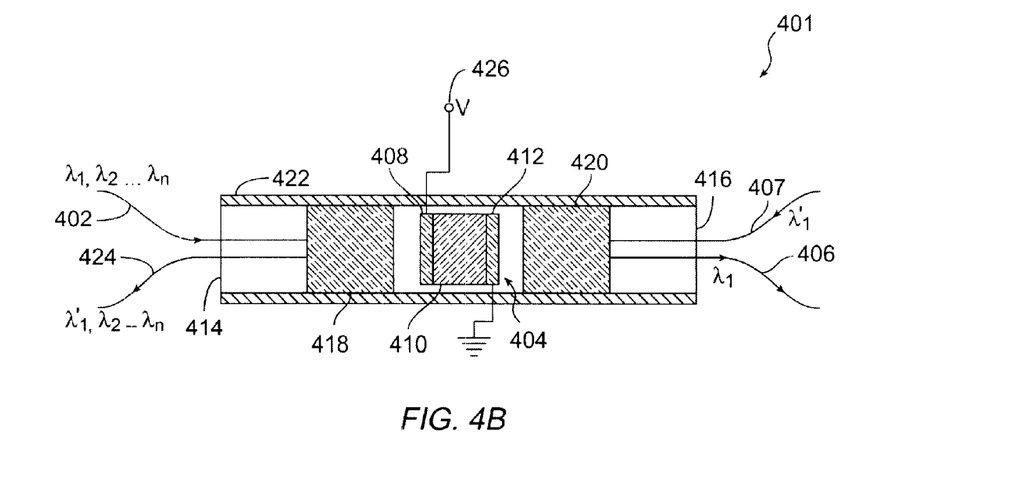
FIG. 4B is a simplified cross section of an ADD/DROP switch according to a further embodiment of the present invention.

FIG. 4B is a simplified schematic of an optical switch according to another embodiment of the present invention configured to provide an ADD/DROP function. When a channel, such as $\lambda_1$, is dropped from the common optical signal, it is often desirable to utilize the now vacant portion of the network bandwidth by adding a channel occupying the same portion of the spectrum as the dropped signal. An ADD fiber 407 is held in the second ferrule 416 along with the DROP fiber 406, both fibers being optically coupled to the FP structure 404 and the EXPRESS 424 and COMMON 402 fibers. The ADD fiber 407 carries an optical channel, $\lambda_1'$, that is coupled though the FP structure 404 to the EXPRESS fiber 424 when the FP structure is in the transmissive state. Thus, the EXPRESS fiber carries $\lambda_1', \lambda_2, \lambda_3, \ldots, \lambda_n$. In the reflection state, the ADD signal is blocked by the second reflector 412 of the FP structure 404.

Figure 4C:
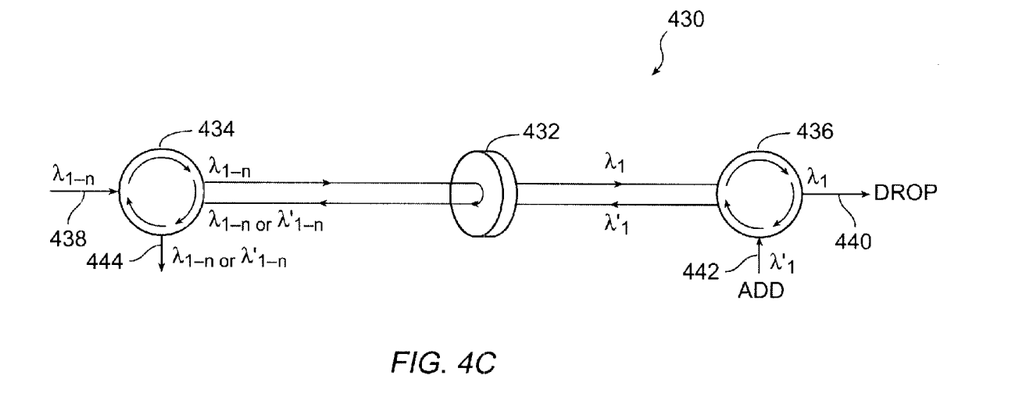
FIG. 4C is a simplified schematic representation of a configurable ADD/DROP multiplexer according to another embodiment of the present invention.

FIG. 4C is a simplified schematic representation of a optical add-drop multiplexer ("OADM") 430 according to another embodiment of the present invention. A multi-cavity Fabry-Perot structure 432, such as a five-cavity structure, is placed between optical isolators 434, 436. The structure might appear superficially similar to OADMs using fiber Bragg gratings ("FBGs"); however, the FBGs operate in reflection mode. A COMMON waveguide 438 provides a plurality of optical channels, $\lambda_1, \ldots, \lambda_n$ to the first optical isolator 434, which couples the channels to the FP structure. If the FP structure is in the transmission mode, a selected channel, $\lambda_1$, is transmitted to the second optical isolator, where it is dropped on the DROP waveguide 440. A channel occupying the same band, $\lambda_1'$, is provided on the ADD waveguide 442, and is coupled through the isolator 436 and the FP structure 432 to the other isolator 434 and thence to the EXPRESS waveguide 444.

When the FP structure is in the reflection mode, all wavelengths provided on the COMMON waveguide 438 are reflected back to the first isolator 434 and coupled to the EXPRESS waveguide 444. Similarly, any ADD channel (i.e. $\lambda_1'$) is reflected back off the FP structure to the second isolator 436, and is not coupled to the EXPRESS port of the first isolator. Thus, the device can change from an OADM to a "transparent" express node, that is, not adding or dropping any channels. Such a device is known as a configurable OADM ("COADM").

Figure 4D:
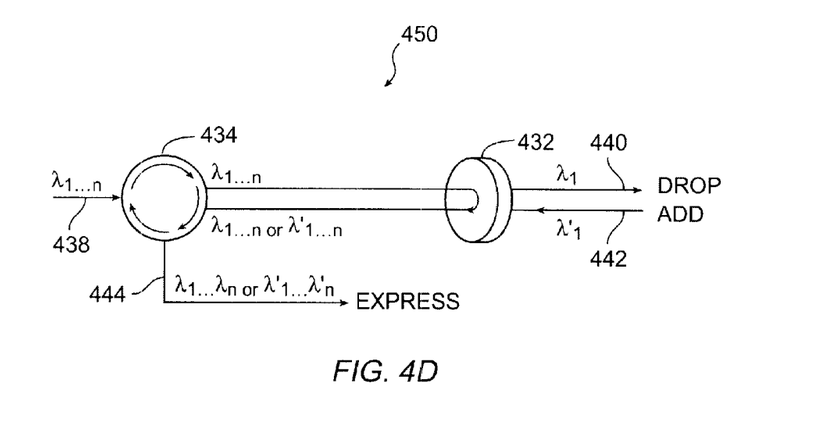
FIG. 4D is a simplified schematic representation of another configurable ADD/DROP multiplexer according to another embodiment of the present invention.

FIG. 4C is a COADM 450 according to another embodiment of the present invention. The COMMON waveguide 438 provides a plurality of optical channels $\lambda_1, \ldots, \lambda_n$, to the isolator 434, and thence to the FP structure 432. In the reflection mode, the FP structure reflects all optical channels back to the isolator 434, and then to the EXPRESS waveguide 444, thus $\lambda_1-\lambda_n$ are expressed. In the transmission mode, $\lambda_1$ is passed through the FP structure 432 and coupled to the DROP waveguide 440, while $\lambda_1'$ is added through the FP structure. Thus a COADM is achieved with a single optical isolator 434.

IV. Switch Characteristics

Figure 5:
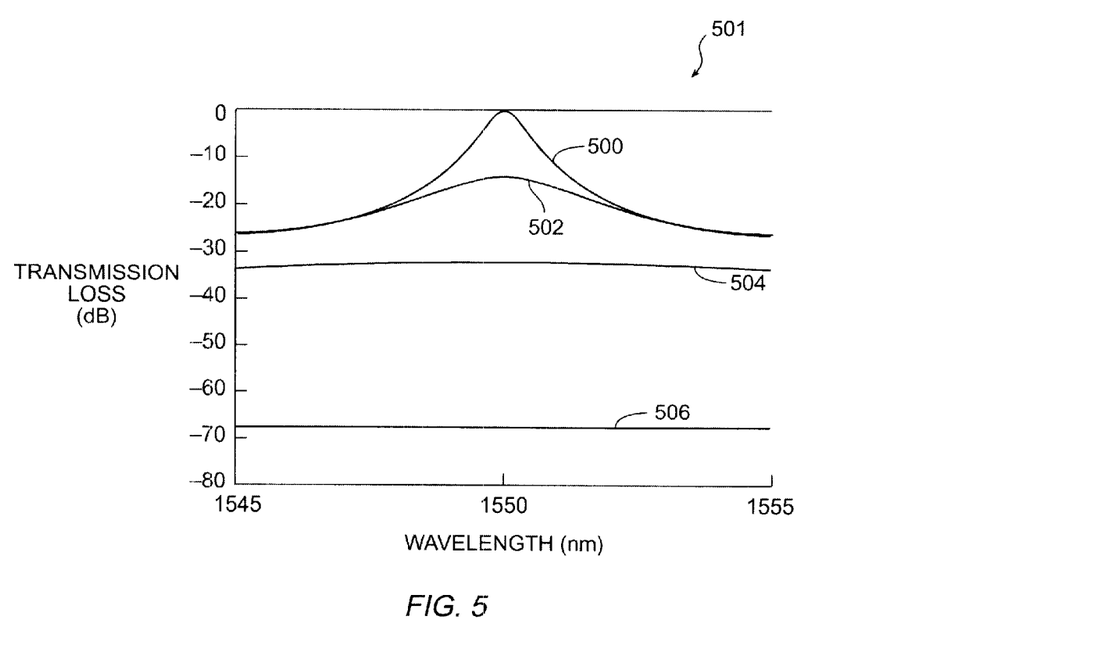
FIG. 5 is a graph of the expected transmission loss versus wavelength for a switch modeled according to FIG. 4A with a design passband of 1550 nm for various values of k.
Figure 6:
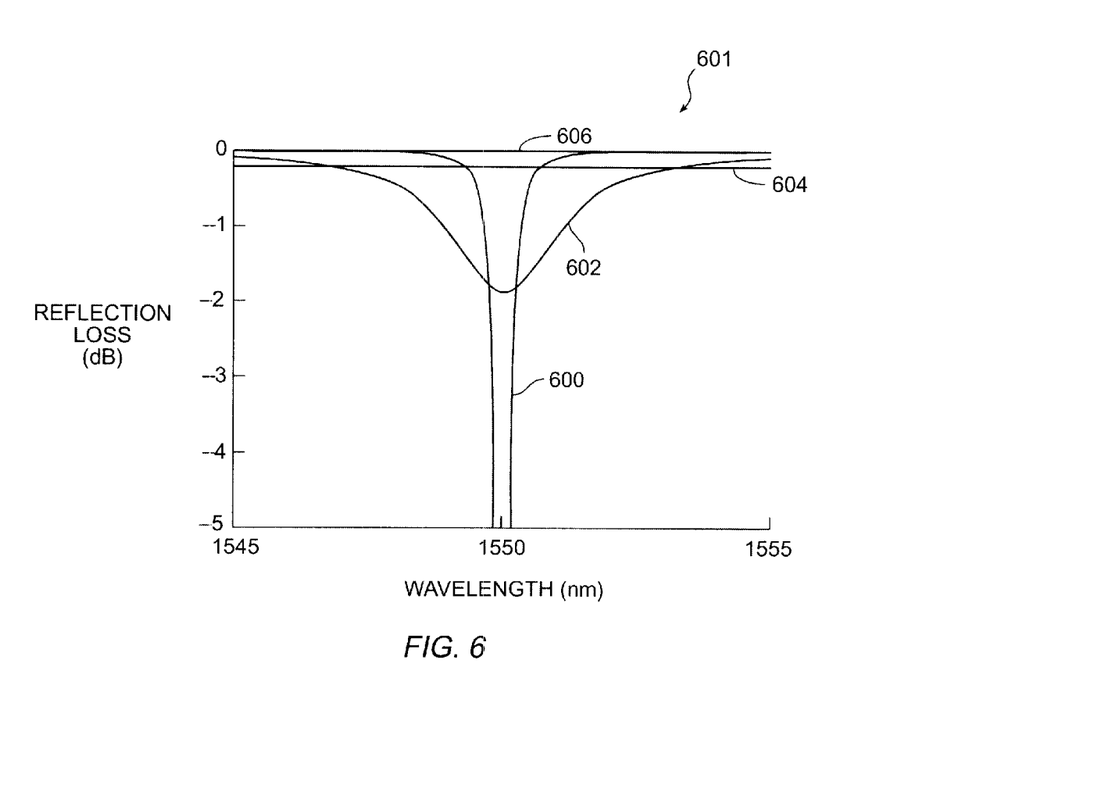
FIG. 6 is a graph of the expected reflection loss versus wavelength of the switch modeled in FIG. 5.

FIGS. 5 and 6 are graphs of the expected transmission loss and reflection loss characteristics of a FP switch modeled in accordance with the switch shown above in FIG. 4A. The transmission loss 501 for absorption in the spacer layer when k=0 500, k=0.001 502, k=0.01 504 and k=0.1 506 is shown in FIG. 5. FIG. 6 shows the reflection loss 601 when k=0 600, k=0.001 602, k=0.01 604, and k=0.1 606. The switch is designed for a passband centered about 1550 nm. In the transmittance state at low values of k the transmittance through the passband is not flat, making the transmittance of the device sensitive to fluctuations in the wavelength of the dropped signal. The drop off in transmittance is also not steep, thus the switch might not provide sufficient channel isolation of adjacent channels in a DWDM system depending on the channel spacing and other system parameters. Similarly, adjacent channels might be affected as the device switches to the reflection mode. There are several ways to improve the frequency characteristics of FP reflection/transmission optical switches.

V. Enhanced Channel Separation

It is generally desirable to switch a selected channel or channels carried on a WDM optical transmission system without affecting adjacent or other non-selected channels. Such a switch would block non-selected channels and transmit the selected channel(s) with minimal "cross-talk" or inter-channel interference. Many approaches have been developed to address channel isolation and switching. The following embodiments describe two devices that incorporate a wavelength-selective channel separating structure in the switch, and two optical switching topologies that incorporate external channel separating devices, namely interleavers and multiplexers, used in conjunction with switches according to the present invention.

Figure 7A:
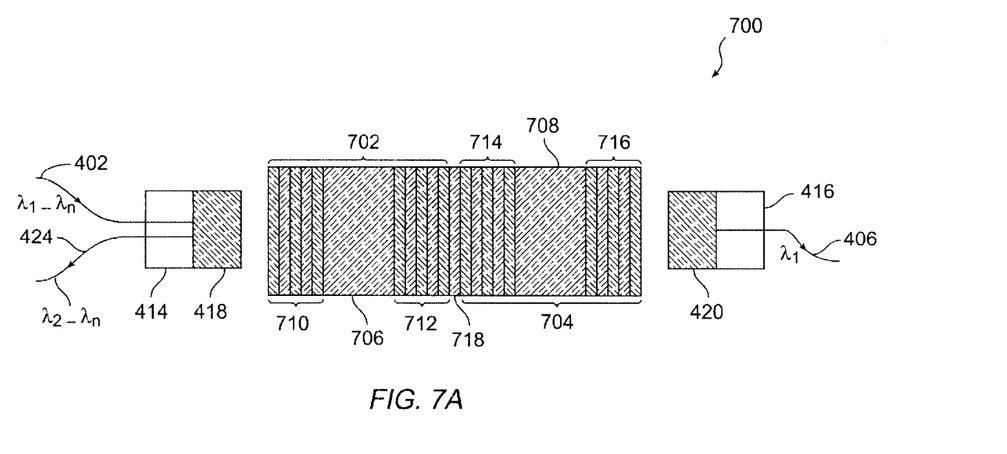
FIG. 7A is a simplified cross section of a switch having an additional, coherently coupled, wavelength-selective optical structure in combination with a Fabry-Perot structure according to another embodiment of the present invention.

FIG. 7A is a simplified cross section of a multi-cavity optical switch 700 according to another embodiment of the present invention. This multi-cavity switch provides improved passband flatness with steeper out-of-band rejection. The optical switch includes two FP filters 702, 704 with spacer regions 706, 708 that are coupled through a layer 718. One spacer 708 is made of an active material and may be switched by applying an external signal to change its k value, and the other spacer 706 is passive in operation. The second spacer could be made from a variety of materials, including spacer material capable of being active, but which is not intentionally switched.

A COMMON fiber 402 provides an optical signal with a plurality of channels, $\lambda_1, \lambda_2$, to the first FP filter 702, which has a first reflector 710, a second reflector 712, and a passive spacer 706. The first FP filter transmits one channel, $\lambda_1$, and reflects the other channel(s) to the EXPRESS fiber 424 in either switch state. The second FP structure 704, which has a third reflector 714, an active spacer 708, and a fourth reflector 716, is switched between a state of transmission and a state of reflection by application of an external stimulus to at least a portion of the spacer region 708. Those skilled in the art will appreciate that the spacer region does not have to be entirely of active material. For example, multiple materials can be used in the spacer region through the use of herpin equivalent layers or otherwise. When the second FP structure 704 is in a state of transmission, the channel of interest $\lambda_1$ is coupled to the DROP fiber 406. When the second FP structure 704 is in a state of reflection, the channel of interest is reflected back to the EXPRESS fiber 424 by reflection off the third reflector 714.

Additional FP structures can be added to the device shown in FIG. 7A. If greater transmission blocking is desired at the switched wavelengths, more active spacers (FP structures) can be added. More passive spacers (FP filters) can be added if greater blocking is required at the adjacent wavelengths. In an alternative embodiment, a WDM filter structure is formed between the COMMON/EXPRESS fibers and an active FP structure. In yet a further embodiment, a WDM filter structure is wafer bonded to the active FP structure, with or without passive FP filters.

It is generally desirable for telecommunications applications that both a high rejection ratio and a low signal loss (<0.5 dB) be achieved in each of the switched states. An optical channel typically occupies a portion, typically roughly the center portion, of the −3 dB passband, and it is generally desirable that the low signal loss and flatness occur at the occupied portion of the passband. Thus it is desirable to have a high transmittance at the nominal center frequency of the device. A high transmittance is achieved in a transparent Fabry-Perot structure when the reflectors are closely balanced. This is true for single cavity devices, such as is illustrated in FIG. 1A, as well as multi-cavity structures., which consists of 2 or more Fabry-Perot filters that have been optically coupled, often through a layer 718 of a quarterwave optical thickness. Though the reflectors in the different Fabry-Perot structures may differ in strength, the two reflectors adjacent to each spacer layer are still closely balanced. The precise values of the reflectances of reflectors and reflector pairs will vary according to design characteristics of the FP structure, as is known in the art. Specifically, the reflectances can be chosen to achieve a desired flatness throughout the occupied portion of the passband. Similarly, incident medium index matching layers may be used at the ends of the device or elsewhere to improve insertion loss and flatness. In a particular embodiment, it is desired that the reflectances of the two reflectors in the active FP structure be within 2% of each other.

Figure 7B:
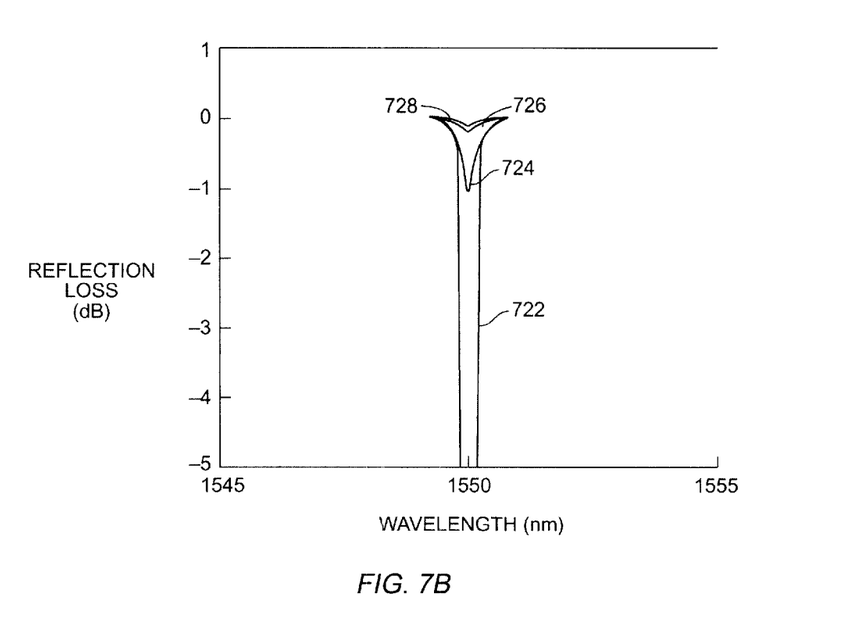
FIG. 7B is a graph showing the expected reflection loss versus wavelength for various values of k for a switch modeled according to FIG. 7A with a design passband of 1550 nm.

FIG. 7B is a graph of the expected reflection loss versus wavelength for k=0 722, k=0.001 724, k=0.01 726, and k=0.1 728 in the spacer region of the second FP structure shown in FIG. 7A (for a nominal passband center frequency of 1550 nm). The first FP filter reflects out-of-band light before it reaches the active portion of the FP switch structure. Light within the passband of the FP structures is coherently coupled between the FP structures through the coupling layer 718.

Figure 8:
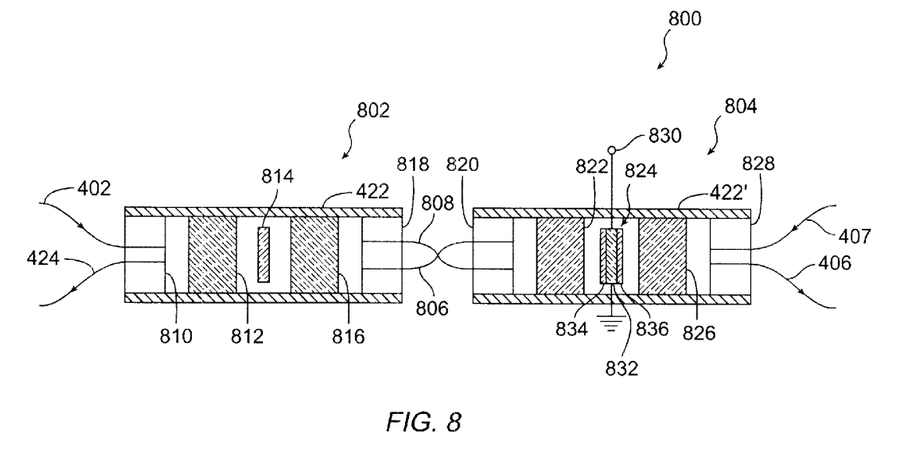
FIG. 8 is a simplified cross section schematic of a switch having an additional, non-coherently coupled, wavelength selective filter in combination with a Fabry-Perot structure according to another embodiment of the present invention.

FIG. 8 is a simplified schematic cross section of a FP switch 800 using a passive filter that is not coherently coupled to the active FP structure. Two subassemblies 802, 804 are optically coupled with intermediate fibers 806, 808. The first subassembly 802 has a first ferrule 810 holding a COMMON fiber 402 and an EXPRESS fiber 424. A first GRIN lens 812 focuses light from the COMMON fiber onto a WDM filter 814, which is then optically coupled to a second GRIN lens 816 and a first intermediate fiber 806 held in a second ferrule 818. The WDM filter may be a dielectric stack filter, fiber Bragg grating, or FP filter(s), among others.

A third ferrule 820 holds the other end of the first intermediate fiber in the second subassembly 804. A third GRIN lens 822 optically couples the optical signal(s) passed by the WDM filter (i.e. the dropped signal(s)) to a switchable FP structure 824. If the switchable FP structure is in the transmissive state, the dropped signal(s) is optically coupled to a DROP fiber 406 through a fourth GRIN lens 826.

An ADD fiber 407 held in the fourth ferrule 828 (along with the DROP fiber 406) provides an ADD signal(s) to the FP structure. The ADD signal is within the passband of the FP structure and WDM filter, and is therefore transmitted to the second intermediate fiber 808 and through the WDM filter to the EXPRESS fiber 424.

A control signal 830 applied to the active spacer region 832 of the FP structure 824 can change the spacer material of the FP structure from transmissive to absorptive, or vice versa. In the absorptive state, the first reflector 834 of the FP structure reflects the DROP signal(s) back to the second intermediate fiber 808 to couple through the WDM filter to the EXPRESS fiber 424, while the second reflector 836 of the FP structure reflects the ADD signal to keep it from entering the FP structure.

Thus an ADD/DROP function is achieved without the movement of optical elements. The control signal can be applied in a smooth and controlled fashion so that the transition between switch states is not abrupt. Similarly, there is no "bouncing" of the switch, as can occur with some mechanical switches. Finally, the switching time can be very short, typically less than 1 mS, and in some instances less than about 1 nS, thus switching is achieved with minimal disruption of signal flow on the optical transmission network.

Figure 9:
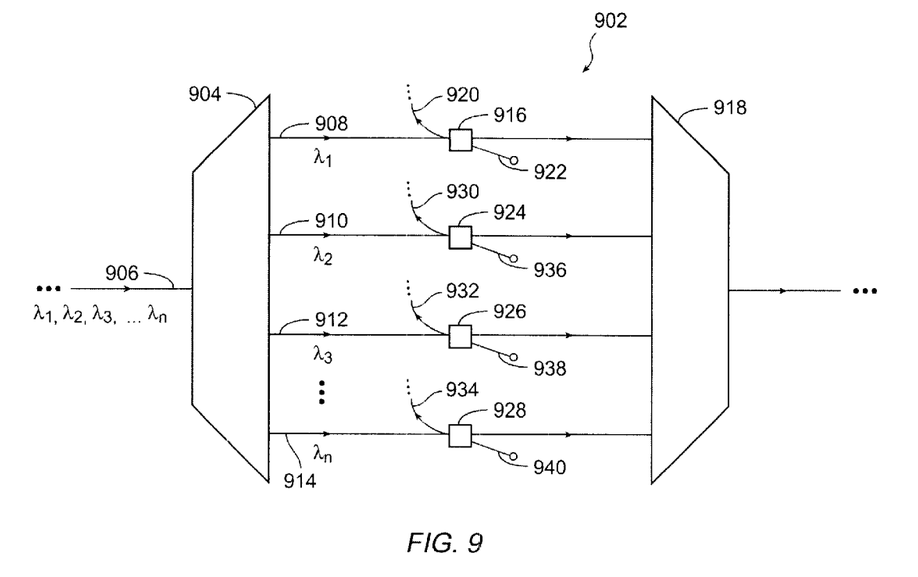
FIG. 9 is a simplified schematic of a portion of a WDM network using a multiplexer/demultiplexer as a channel-separating optical device in combination with Fabry-Perot switches according to yet another embodiment of the present invention.

FIG. 9 is a simplified schematic of FP switches used in conjunction with an optical demultiplexer/multiplexer as a channel-separating device in a WDM system 902. The optical demultiplexer 904 separates the optical channels, $\lambda_1$, $\lambda_2$, $\lambda_3$, . . . , $\lambda_n$, carried on an input fiber 906 into corresponding optical paths 908, 910, 912, 914. A FP switch 916 is placed in the optical path 908 so that the signal(s) carried on the path are sent either to an optical multiplexer 918 or to a channel output 920 according to the operation of the switch 916 in response to a control signal 922. The FP switch could be a switch according to those described in FIGS. 1A and 1B, FIG. 4A, or FIG. 7A, among others. The optical demultiplexer provides the desired channel separation in conjunction with the FP switch, which can include filter structures in addition to the active FP structure, either for channel separation and/or passband flatness. The system has other FP switches 924, 926, 928, with switchable output paths 930, 932, 934 that are selectable according to control signals 936, 938, 940.

Other channel-separating devices could be used, one example of which is an interleaver. An interleaver generally separates the channels on an input signal into "even" and "odd" channels, thus basically doubling the separation between channels and relaxing the out-of-band rejection required by an individual wavelength-selective FP switch.

VI. An Exemplary Processes

Figure 10A:
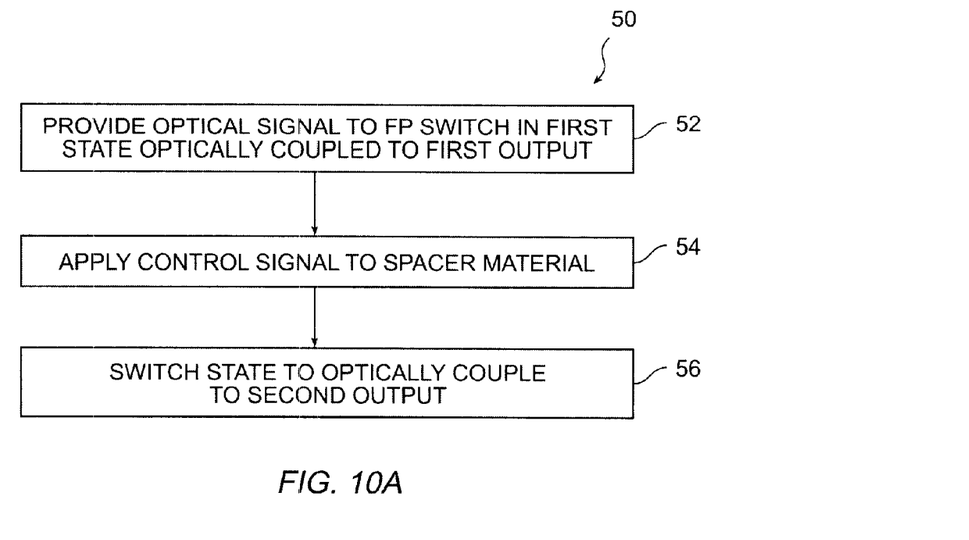
FIG. 10A is a simplified flow chart of a process of switching an optical signal according to an embodiment of the present invention.

FIG. 10A is a simplified flow chart of a process for switching an optical signal 50 according to an embodiment of the present invention. An optical signal is provided to an optical switch having a FP structure with an active material in a spacer region, the switch directing to optical signal to a first switch output (step 52). A control signal is applied to the active material (step 54) to change of the refractive index of the material thereby switching the optical signal to a second switch output (step 56). In a particular embodiment, the change in refractive index is primarily a change in the imaginary portion of the refractive index. Steps 54 and 56 occur essentially concurrently.

Figure 10B:
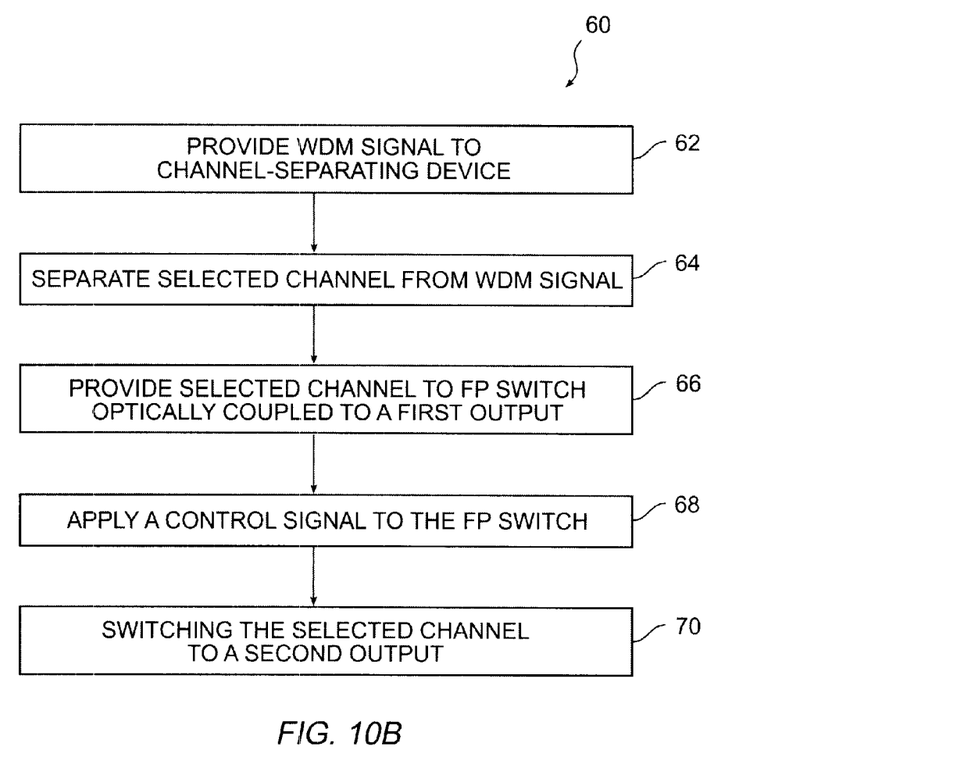
FIG. 10B is a simplified flow chart of a process for switching a channel in a WDM optical system according to another embodiment of the present invention.

FIG. 10B is a simplified flow chart of a process for switching a selected channel(s) in a WDM optical network with a FP switch 60 according to another embodiment of the present invention. An optical signal containing a plurality of channels is provided to a channel-separating optical device (step 62). The channel-separating optical device could be a WDM filter, a fiber Bragg grating, a FP filter, an optical demultiplexer, or an optical interleaver, for example. Separating a selected portion of the optical signal from a remainder of the optical signal (step 64). Providing the selected portion of the optical signal to the FP switch (step 66) that couples the selected portion of the optical signal to a first switch output, and applying a control signal to the FP switch (step 68) to switch the selected portion of the optical signal to a second switch output (step 70).

While the description above provides a full and complete disclosure of the preferred embodiments of the present invention, various modifications, alternatives, and equivalents will be obvious to those of skill in the art. For example, although embodiments have generally been illustrated using optical fibers, ferrules, and GRIN lenses, other types of equivalent structures, such as thin-film optical waveguides instead of fibers, V-grooves or channels instead of ferrules, and a variety of other lenses or other optical elements instead of GRIN lenses could be used. Similarly, additional types of reflectors and active materials may be known or become known, and the examples provided herein are merely illustrative, as are the types of control signals and/or structures and methods of applying the control signals. Additional elements might be incorporated into the structure of the switches, such as additional filters or anti-reflective coatings. Additional methods of supplying a current and/or electric field to the active portion of the spacers may be used, such as the proton implantation or dielectric aperture methods. Accordingly, the scope of the invention is limited solely by the following claims.

What is claimed is:

1. An optical switch comprising:
   an optical input configured to provide a plurality of optical channels, the optical input optically coupled to
   a passive wavelength-selective optical component disposed to optically couple at least one selected optical channel of the plurality of optical channels to
   an active Fabry-Perot structure configured to transmit the at least one selected optical channel to
   a first optical output when the Fabry-Perot structure is in a transmissive state and to reflect the at least one selected optical channel to
   a second optical output when the Fabry-Perot structure is in a reflective state, the optical switch switching between the first state and the second state in response to a control signal, and the passive wavelength-selective optical component disposed to optically couple a remainder of the plurality of optical channels to the second optical output.

2. The optical switch of claim 1 wherein the passive wavelength-selective optical component is a passive Fabry-Perot filter.

3. The optical switch of claim 1 wherein the passive wavelength-selective optical component is a wavelength-division multiplex filter.

4. The optical switch of claim 1 wherein the passive wavelength-selective optical component is an optical demultiplexer.

5. The optical switch of claim 1 wherein the active Fabry-Perot structure includes a spacer region having an active material, the active material changing absorption in response to the control signal.

6. The optical switch of claim 1 wherein the passive wavelength-selective optical component reflects a remainder of the plurality of optical channels to the second optical output.

7. The optical switch of claim 6 further comprising a second optical input, the second optical input being optically coupled to the second optical output when the Fabry-Perot structure is in the transmissive state, and not optically coupled to the second optical output when the Fabry-Perot structure is in the reflective state.

8. An optical add-drop multiplexer comprising:
   a first optical input configured to provide a plurality of optical channels, the optical input optically coupled to
   a passive wavelength-selective optical structure disposed between the first optical input and
   an active Fabry-Perot structure, the passive wavelength-selective optical structure capable of optically coupling at least one of the plurality of optical channels from to the active Fabry-Perot structure to transmit the at least one optical channel to a first optical output when the active Fabry-Perot structure is in a transmissive state, and to reflect the at least one optical channel to a second optical output when the active Fabry-Perot structure is in a reflective state, the optical add-drop multiplexer switching between the first state and the second state in response to a control signal, wherein the passive wavelength-selective optical structure reflects a remainder of the plurality of optical channels to the second optical output; and a second optical input is optically coupled to the second optical output when the active Fabry-Perot structure is in the transmissive state, and not optically coupled to the second optical output when the active Fabry-Perot structure is in the reflective state.

9. The optical switch of claim 8 wherein the active Fabry-Perot structure includes a semiconductor material as an active material in a spacer region of the active Fabry-Perot structure and the control signal is an electronic signal.

10. If The optical switch of claim 8 wherein the Fabry-Perot structure includes a spacer region of the Fabry-Perot consisting essentially of a semiconductor material.

11. The optical device of claim 5 wherein the active material comprises a semiconductor material.

12. The optical device of claim 5 wherein the active material comprises a liquid crystal.

13. The optical device of claim 5 wherein the active material comprises en electrochromic material.

14. The optical device of claim 1 wherein the active Fabry-Perot structure includes a first reflector comprising a first dielectric stack disposed on a first side of the spacer region.

15. The optical deice of claim 14 wherein the active Fabry-Perot structure further includes a second reflector comprising a second dielectric stack disposed on a second side of the spacer region, a reflectivity difference between a first reflectivity of the first reflector and a second reflectivity of the second reflector being less than about 2%.

16. The optical device of claim 5 wherein the active Fabry-Perot structure includes a first reflector comprising a first dielectric stack disposed on a first side of the spacer region.

17. The optical device of claim 16 wherein the active Fabry-Perot structure further includes a second reflector comprising a second dielectric stack disposed on a second side of the spacer region, a reflectivity difference between a first reflectivity of the first reflector and a second reflectivity of the second reflector being less than about 2%.

* * * * *